United States Patent
Park et al.

(10) Patent No.: US 8,345,611 B2
(45) Date of Patent: Jan. 1, 2013

(54) METHOD OF TRANSMITTING A DATA BLOCK IN A WIRELESS COMMUNICATION SYSTEM

(75) Inventors: Sung Jun Park, Gyeonggi-do (KR); Young Dae Lee, Gyeonggi-do (KR); Seung June Yi, Gyeonggi-do (KR); Sung Duck Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 12/677,945

(22) PCT Filed: Sep. 18, 2008

(86) PCT No.: PCT/KR2008/005517
§ 371 (c)(1),
(2), (4) Date: Mar. 12, 2010

(87) PCT Pub. No.: WO2009/038363
PCT Pub. Date: Mar. 26, 2009

(65) Prior Publication Data
US 2010/0254480 A1    Oct. 7, 2010

Related U.S. Application Data

(60) Provisional application No. 60/973,442, filed on Sep. 18, 2007, provisional application No. 60/974,072, filed on Sep. 20, 2007, provisional application No. 60/975,582, filed on Sep. 27, 2007, provisional application No. 60/976,766, filed on Oct. 1, 2007, provisional application No. 61/019,834, filed on Jan. 8, 2008, provisional application No. 61/025,267, filed on Jan. 31, 2008.

(30) Foreign Application Priority Data

Sep. 17, 2008  (KR) .......................... 10-2008-0091035

(51) Int. Cl.
*H04W 4/00* (2009.01)
*H04B 7/212* (2006.01)

(52) U.S. Cl. ........ 370/329; 370/341; 370/348; 370/474; 370/476

(58) Field of Classification Search .................. None
See application file for complete search history.

(56) References Cited

U.S. PATENT DOCUMENTS 5,878,041 A    3/1999   Yamanaka et al.
(Continued)

FOREIGN PATENT DOCUMENTS

CN    1339903    3/2002
(Continued)

OTHER PUBLICATIONS

Kashima, T.; "Method and Apparatus for Providing Timing Alignment"; U.S. Appl. No. 60/944,662, filed Jun. 18, 2007.

(Continued)

*Primary Examiner* — Andrew Chriss
(74) *Attorney, Agent, or Firm* — Lee, Hong, Degerman, Kang & Waimey

(57) ABSTRACT

A method of transmitting a data block in a wireless communication system is disclosed. A method of transmitting a data block in a user equipment of a wireless communication system comprises receiving upper layer data through at least one upper layer channel, generating a data block including at least a part of the upper layer data, at least one channel indicator indicating each of the at least one upper layer channel, and information associated with quality of a service provided through the at least one upper layer channel established in the user equipment, and transferring the generated data block to a lower layer.

5 Claims, 10 Drawing Sheets

U.S. PATENT DOCUMENTS

| | | |
|---|---|---|
| 6,445,917 B1 | 9/2002 | Bark et al. |
| 6,594,240 B1 | 7/2003 | Chuah et al. |
| 6,728,918 B1 | 4/2004 | Ikeda et al. |
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 * | 2/2009 | Yi et al. .................. 370/474 |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 * | 8/2005 | Zhang et al. .................. 370/437 |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 * | 9/2005 | Kim et al. .................. 370/466 |
| 2005/0237932 A1 | 10/2005 | Liu |
| 2005/0238051 A1 | 10/2005 | Yi et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 * | 8/2006 | Petrovic et al. .................. 370/332 |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0297360 A1 * | 12/2007 | Joachim et al. .................. 370/329 |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0233941 A1 | 9/2008 | Jen |
| 2008/0268878 A1 | 10/2008 | Wang et al. |
| 2008/0273482 A1 | 11/2008 | Lee et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0232076 A1 | 9/2009 | Kuo |
| 2009/0259908 A1 | 10/2009 | Gollapudi |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |

| | | |
|---|---|---|
| 2010/0157904 A1 | 6/2010 | Ho et al. |
| 2010/0172282 A1 | 7/2010 | Zhang et al. |
| 2010/0232335 A1 | 9/2010 | Lee et al. |
| 2011/0019604 A1 | 1/2011 | Chun et al. |
| 2011/0033048 A1 | 2/2011 | Stanwood et al. |

FOREIGN PATENT DOCUMENTS

| | | |
|---|---|---|
| CN | 1390425 | 1/2003 |
| CN | 1396780 | 2/2003 |
| CN | 1613210 | 5/2005 |
| CN | 1642067 | 7/2005 |
| CN | 1761260 | 4/2006 |
| CN | 1761356 | 4/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| EP | 1263160 | 12/2002 |
| EP | 1343267 | 1/2003 |
| EP | 1326397 | 7/2003 |
| EP | 1508992 | 2/2005 |
| EP | 1509011 | 2/2005 |
| EP | 1638237 | 3/2006 |
| EP | 1689130 | 8/2006 |
| EP | 1746855 | 1/2007 |
| EP | 1768297 | 3/2007 |
| EP | 1796405 | 6/2007 |
| EP | 2026523 | 2/2009 |
| JP | 07162948 | 6/1995 |
| JP | 2000324161 | 11/2000 |
| JP | 2001197021 | 7/2001 |
| JP | 2002198895 | 7/2002 |
| JP | 2003018050 | 1/2003 |
| JP | 2003-115796 | 4/2003 |
| JP | 2003115876 | 4/2003 |
| JP | 2003229925 | 8/2003 |
| JP | 2003283592 | 10/2003 |
| JP | 2005073276 | 3/2005 |
| JP | 2006054718 | 2/2006 |
| JP | 2006505209 | 2/2006 |
| JP | 2006514466 | 4/2006 |
| JP | 2006121562 | 5/2006 |
| JP | 2006311543 | 11/2006 |
| JP | 2007116639 | 5/2007 |
| JP | 2007312244 | 11/2007 |
| JP | 2008520125 | 6/2008 |
| JP | 2009521893 | 6/2009 |
| KR | 1020010045783 | 6/2001 |
| KR | 1020010062306 | 7/2001 |
| KR | 1020020004645 | 1/2002 |
| KR | 1020020012048 | 2/2002 |
| KR | 1020020097304 | 12/2002 |
| KR | 1020030060055 | 7/2003 |
| KR | 1020030068743 | 8/2003 |
| KR | 1020040034398 | 4/2004 |
| KR | 1020040039944 | 5/2004 |
| KR | 1020040072961 | 8/2004 |
| KR | 1020050022988 | 3/2005 |
| KR | 1020050062359 | 6/2005 |
| KR | 1020050081836 | 8/2005 |
| KR | 1020050092874 | 9/2005 |
| KR | 1020050099472 | 10/2005 |
| KR | 1020050100882 | 10/2005 |
| KR | 1020060004935 | 1/2006 |
| KR | 1020060014910 | 2/2006 |
| KR | 10-2006-0029452 | 4/2006 |
| KR | 10-0566795 | 4/2006 |
| KR | 1020060042858 | 5/2006 |
| KR | 1020060069378 | 6/2006 |
| KR | 1020060079784 | 7/2006 |
| KR | 1020060090191 | 8/2006 |
| KR | 1020060134058 | 12/2006 |
| KR | 10-0677131 | 2/2007 |
| KR | 1020070048552 | 5/2007 |
| KR | 10-2007-0076374 | 7/2007 |
| KR | 10-0907978 | 7/2009 |
| KR | 10-2009-0084756 | 8/2009 |
| RU | 2304348 | 8/2007 |
| TW | 496058 | 7/2002 |
| WO | 01/37473 | 5/2001 |
| WO | 01/39386 | 5/2001 |
| WO | 03045103 | 5/2003 |
| WO | 2004/042953 | 5/2004 |
| WO | 2004042963 | 5/2004 |
| WO | 2005039108 | 4/2005 |
| WO | 2005/078967 | 8/2005 |
| WO | 2005/122441 | 12/2005 |
| WO | 2005125226 | 12/2005 |
| WO | 2006/009714 | 1/2006 |
| WO | 2006/016785 | 2/2006 |
| WO | 2006/033521 | 3/2006 |
| WO | 2006-046894 | 5/2006 |
| WO | 2006052086 | 5/2006 |
| WO | 2006/083149 | 8/2006 |
| WO | 2006095385 | 9/2006 |
| WO | 2006118418 | 9/2006 |
| WO | 2006/104335 | 10/2006 |
| WO | 2006/104342 | 10/2006 |
| WO | 2006/116620 | 11/2006 |
| WO | 2006/118435 | 11/2006 |
| WO | 2007/020070 | 2/2007 |
| WO | 2007/023364 | 3/2007 |
| WO | 2007024065 | 3/2007 |
| WO | 2007/045505 | 4/2007 |
| WO | 2007039023 | 4/2007 |
| WO | 2007/052921 | 5/2007 |
| WO | 2007052900 | 5/2007 |
| WO | 2007066900 | 6/2007 |
| WO | 2007/078174 | 7/2007 |
| WO | 2007/079085 | 7/2007 |
| WO | 2007078142 | 7/2007 |
| WO | 2007078164 | 7/2007 |
| WO | 2007078173 | 7/2007 |
| WO | 2007078174 | 7/2007 |
| WO | 2007/091831 | 8/2007 |
| WO | 2007089797 | 8/2007 |
| WO | 2007126793 | 11/2007 |
| WO | 2007147431 | 12/2007 |
| WO | 2008/004725 | 1/2008 |
| WO | 2008/010063 | 1/2008 |
| WO | 2008/094120 | 8/2008 |
| WO | 2009/035301 | 3/2009 |

OTHER PUBLICATIONS

Lin, L.C.; "Enhanced random access response formats in E-UTRA"; U.S. Appl. No. 61/006,348, filed Jan. 8, 2008.
Zte, "Redundant Retransmission Restraint in RLC-AM," 3GPP TSG-RAN WG2 Meeting #53, R2-061234, May 8, 2006, XP-050131180.
European Telecommunication Standards Institute (ETSI), "Digital Cellular Telecommunications System (Phase 2+), Functional Stage 2 Description of Location Services (LCS) in GERAN," ETSI Technical Specification, ETSI TS 143 059, V7.3.0, May 2007, XP-014038519.
Qualcomm Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
Ericsson, "SDU Discard", R2-073230, 3GPP TSG-RAN WG2 #59, Aug. 2007.
Motorola, "Synchronized Random Access Channel and Scheduling Request," R1-063046, 3GPP TSG RAN1#47, Nov. 2006.
NTT DoCoMo et al., "Scheduling Request Transmission Method for E-UTRA Uplink," R1-063301, 3GPP TSG RAN WG1 Meeting #47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.

Texas Instruments, "UL Synchronization Management in LTE_ACTIVE," R1-071478, 3GPP TSG RAN WG1 #48bis, Mar. 2007, XP-050105413.

Texas Instruments, "UL Synchronization Management and Maintenance in E-UTRA," R1-072198, 3GPP TSG RAN WG1 #49, May 2007, XP-050105936.

LG Electronics Inc., "UE State Transition in LTE_ACTIVE," R2-061002, 3GPP TSG RAN WG2 #52, Mar. 2006, XP-050130928.

Ericsson, "Scheduling Request in E-UTRAN," R1-070471, 3GPP TSG RAN WG2 #47bis, Jan. 2007, XP-050104502.

Motorola, "Contention-Free Intra-LTE Handover," R2-070730, 3GPP TSG RAN WG2 #57, Feb. 2007, XP-050133763.

3rd Generation Partnership Project (3GPP); "Technical Specification Group Radio Access Network; Evolved Universal Terrestrial Radio Access (E-UTRA) Radio Link Control (RLC) protocol specification (Release 8)", 3GPP TS 36.322 V8.0.0, Dec. 2007.

"Miscellaneous corrections to TS 36.322", R2-081700, 3GPP TSG-RAN2 Meeting #61bis, Mar. 2008.

Ericsson, "Clarification to the handling of large RLC status reports", R2-082018, 3GPP TSG-RAN2 Meeting #61bis, Mar. 2008.

LG Electronics Inc. et al., "ACK_SN setting for short Status PDU", R2-082133, 3GPP TSG-RAN WG2 #62, May 2008.

Ghosh, A., et al.; "Random Access Design for UMTS Air-Interface Evolution"; IEEE 65th Vehicular Technology Conference, Apr. 2007; pp. 1041-1045.

Sadayuki, Abeta, et al.; "Super 3G Technology Trends Part 2: Research on Super 3G Technology"; NTT DoCoMo Technical Journal, vol. 8, No. 3, pp. 55-62, Dec. 2006.

Nokia; "System Information Distribution"; 3GPP TSG-RAN WG2 Ad Hoc Meeting on LTE; R2-061487; Jun. 2006.

LG ELectronics; "Delivery of LTE System Information"; 3GPP TSG-RAN WG2 Ad Hoc on LTE; R2-061959; pp. 1-4, Jun. 2006.

NEC; "Optimized Buffer Status Reporting"; 3GPP TSG-RAN WG2; Tdoc: R2-072515; Jun. 2007; XP-002503220.

Catt, Ritt; "Consideration on UL Buffer Reporting" 3GPP TSG RAN WG2 #55; R2-062934, Oct. 2006; XP-002513924.

Wang, P.S., "Operation of Control Protocol Data Units in Packet Data Convergence Protocol," U.S. Appl. No. 60/976,139, filed Sep. 28, 2007.

Mukherjee, R.P., "Method and Apparatus of Performing Packet Data Convergence Protocol Reset," U.S. Appl. No. 61/019,058, filed Jan. 4, 2008.

Cohen, "An Improved SSCOP-like Scheme for Avoiding Unnecessary Retransmissions and Achieving Ideal Throughput," Proceedings of IEEE INFOCOM Conference on Computer Communications, pp. 855-862, Mar. 1996, XP-010158150.

LG Electronics Inc., "Correction of status report coding," R2-080969, 3GPP TSG RAN WG2 #61, Feb. 2008, XP-002624626.

LG Electronics, "Correction to PDCP Status Report," R2-081594, 3GPP TSG-RAN2 Meeting #61bis, Mar. 2008, XP-002624627.

Alcatel-Lucent, "PDCP status report carrying LIS only," R2-080902, 3GPP TSG RAN WG2 #61, Jan. 2008, XP-050138711.

3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323 V8.2.1, May 2008, XP-050377638.

Qualcomm Europe, "Further Details on RACH Procedure," R1-070649, 3GPP TSG-RAN WG1 #48, Feb. 2007.

NTT DoCoMo, Inc., "Buffer Status Report and Scheduling Request triggers," R2-073574, 3GPP TSG RAN WG2 #59, Aug. 2007.

Ericsson, "RLC status report format", R2-074701, TSG-RAN WG2 Meeting #60, Nov. 2007.

Rapporteur (ASUSTeK), "Summary of HFN de-synchronization problem off-line email discussion", R2-050318, 3GPP TSG RAN WG2 #46, Feb. 2005.

ASUSTeK, "On-line recovery of HFN synchronization due to RLC UM SN problem", R2-041940, 3GPP TSG-RAN WG2 meeting #44, Oct. 2004.

ITRI, "Buffer Status Reporting with Group Combining for LTE", R2-072833, 3GPP TSG-RAN-WG2 Meeting #58bis, Jun. 2007.

NEC, "Considerations on Scheduling Information", R2-073556, 3GPP TSG-RAN WG2#59, Aug. 2007.

LG Electronics, "Update of eUtran PDCP specification", R2-081390, 3GPP TSG-RAN2 Meeting #61, Jan. 2008.

"Universal Mobile Telecommunications System (UMTS); Radio Link Control (RLC) protocol specification (3GPP TS 25.322 version 4.10.0 Release 4)", ETSI TS 125 322, Sep. 2003, XP-014016803.

LG Electronics Inc, "Correction to Polling Procedure", R2-081588, 3GPP TSG-RAN WG2 #61bis, Mar. 2008, XP-050139320.

3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.

Motorola, "MAC Header format", R2-074419, 3GPP TSG-RAN2 Meeting #59bis, Oct. 2007.

NTT DoCoMo, Inc. et al, "MAC PDU structure for LTE", R2-074174, 3GPP TSG RAN WG2 #59bis, Oct. 2007.

3rd Generation Partnership Project (3GPP); "Technical Specification Group Radio Access Network; Medium Access Control (MAC) protocol specification (Release 7)", 3GPP TS 25.321 V7.5.0, Jun. 2007.

"LTE User Plane session report", R2-074536, 3GPP TSG RAN WG2 #59bis, Oct. 2008.

ASUSTeK Computer Inc., "HFN de-synchronization detection with Integrity Protection scheme in a wireless communications system", U.S. Appl. No. 60/863,800.

Qualcomm Europe, "UL requests", R1-070426, 3GPP TSG-RAN WG1 #47bis, Jan. 2007.

Alcatel-Lucent, "Format for RACH Message 2", R2-080176, 3GPP TSG RAN WG2 #60bis, Jan. 2008.

Motorola, "Design of backoff scheme for LTE", R2-070143, 3GPP TSG-RAN-WG2 Meeting #56bis, Jan. 2007.

MAC Rapporteurs (Ericsson, Qualcomm Europe), "E-Utra Mac protocol specification update", R2-080631, 3GPP TSG-RAN2 Meeting #60bis, Jan. 2008.

* cited by examiner

FIG. 7B

| R | H | E | LCID | Oct 1 |
| F | | L | | Oct 2 |

(a)

| R | H | E | LCID | Oct 1 |
| F | | L | | Oct 2 |
| | | L | | Oct 3 |

| R | H | E | LCID | Oct 1 |

METHOD OF TRANSMITTING A DATA BLOCK IN A WIRELESS COMMUNICATION SYSTEM

CROSS-REFERENCE TO RELATED APPLICATIONS

This application is the National Stage filing under 35 U.S.C. §371 of International Application No. PCT/KR2008/005517, filed on Sep. 18, 2008, which claims the benefit of earlier filing date and right of priority to Korean Application No. 10-2008-0091035, filed on Sep. 17, 2008, and also claims the benefit of U.S. Provisional Application Ser. Nos. 60/973,442, filed on Sep. 18, 2007, 60/974,072, filed on Sep. 20, 2007, 60/975,582, filed on Sep. 27, 2007, 60/976,766, filed on Oct. 1, 2007, 61/019,834, filed on Jan. 8, 2008, and 61/025,267, filed on Jan. 31, 2008.

TECHNICAL FIELD

The present invention relates to a wireless communication system, and more particularly, to a method of transmitting a data block in a wireless communication system.

BACKGROUND ART

In a wireless communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or a base station can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

An evolved universal mobile telecommunications system (E-UMTS) which is currently being discussed uses 10 ms radio frame comprising 10 sub-frames. Namely, one sub-frame includes two continuous slots. One slot has a length of 0.5 ms. Also, one sub-frame comprises a plurality of OFDM symbols, and a part (for example, first symbol) of the plurality of OFDM symbols can be used for transmission of L1/L2 control information.

FIG. 1 illustrates an example of a structure of physical channels used in the E-UMTS. In FIG. 1, one sub-frame comprises an L1/L2 control information transmission region (hatching part) and a data transmission region (non-hatching part).

FIG. 2 illustrates a general method of transmitting data in the E-UMTS. In the E-UMTS, a hybrid auto repeat request (HARQ) scheme, which is one of data retransmission schemes, is used to improve throughput, thereby enabling desirable communication.

Referring to FIG. 2, the base station transmits downlink scheduling information (hereinafter, referred to as 'DL scheduling information') through DL L1/L2 control channel, for example, a physical downlink control channel (PDCCH), to transmit data to a user equipment in accordance with the HARQ scheme. The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator.

In order to notify that DL scheduling information is transmitted through the PDCCH for what user equipment, the user equipment identifier (or group identifier), for example, a radio network temporary identifier (RNTI) is transmitted. The RNTI can be classified into a dedicated RNTI and a common RNTI. The dedicated RNTI is used for data transmission and reception to and from a user equipment of which information is registered with a base station. The common RNTI is used if communication is performed with user equipments, which are not allocated with dedicated RNTI as their information is not registered with the base station. Alternatively, the common RNTI is used for transmission and reception of information used commonly for a plurality of user equipments, such as system information. For example, examples of the common RNTI include RA-RNTI and T-C-RNTI, which are used during a random access procedure through a random access channel (RACH). The user equipment identifier or group identifier can be transmitted in a type of CRC masking in DL scheduling information transmitted through the PDCCH.

User equipments located in a specific cell monitor the PDCCH through the L1/L2 control channel using their RNTI information, and receive DL scheduling information through the corresponding PDCCH if they successfully perform CRC decoding through their RNTI. The user equipments receive downlink data transmitted thereto through a physical downlink shared channel (PDSCH) indicated by the received DL scheduling information.

As described above, in order to efficiently use limited radio resources in the wireless communication system, uplink scheduling and downlink scheduling are performed. Particularly, in the system which uses multiple carriers such as OFDMA or SC-FDMA, since a radio resource block formed by a specific time zone and a specific frequency band can be used by only one user equipment, scheduling, which determines how many radio resources are allocated to each user equipment and also determines when the radio resources are allocated to each user equipment, is very important.

For scheduling, the user equipment can perform a buffer status report (BSR) and a channel resource request. The user equipment can allow a network to efficiently perform scheduling by notifying the network of data stored in its buffer, through the buffer status report. The network can perform proper scheduling by identifying what user equipment needs how many radio resources, using the buffer status report. Meanwhile, the user equipment can actively request the network to allocate radio resources.

DISCLOSURE OF THE INVENTION

In order that a network efficiently uses radio resources by performing proper scheduling, it is very important that the network exactly and quickly identifies a buffer status of each user equipment.

An object of the present invention is to provide a method of transmitting a data block in a wireless communication system, in which radio resources can efficiently be used in the wireless communication system.

Another object of the present invention is to provide a method of transmitting a data block in a wireless communication system, in which reliability in a buffer status report performed by a user equipment can be enhanced in the wireless communication system.

It is to be understood that the technical solutions to be achieved by the present invention will not be limited to the aforementioned description, and another technical solutions will be apparent to those skilled in the art to which the present invention pertains, from the following detailed description of the present invention.

BRIEF DESCRIPTION OF THE DRAWINGS

FIG. 5A and FIG. 5B are diagrams illustrating a structure of a radio interface protocol between a user equipment (UE) and E-UTRAN, in which FIG. 5A is a schematic view of a control plane protocol and FIG. 5B is a schematic view of a user plane protocol;

FIG. 7A to FIG. 7C are diagrams illustrating data formats of a MAC PDU (protocol data unit) according to one embodiment of the present invention.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 1:
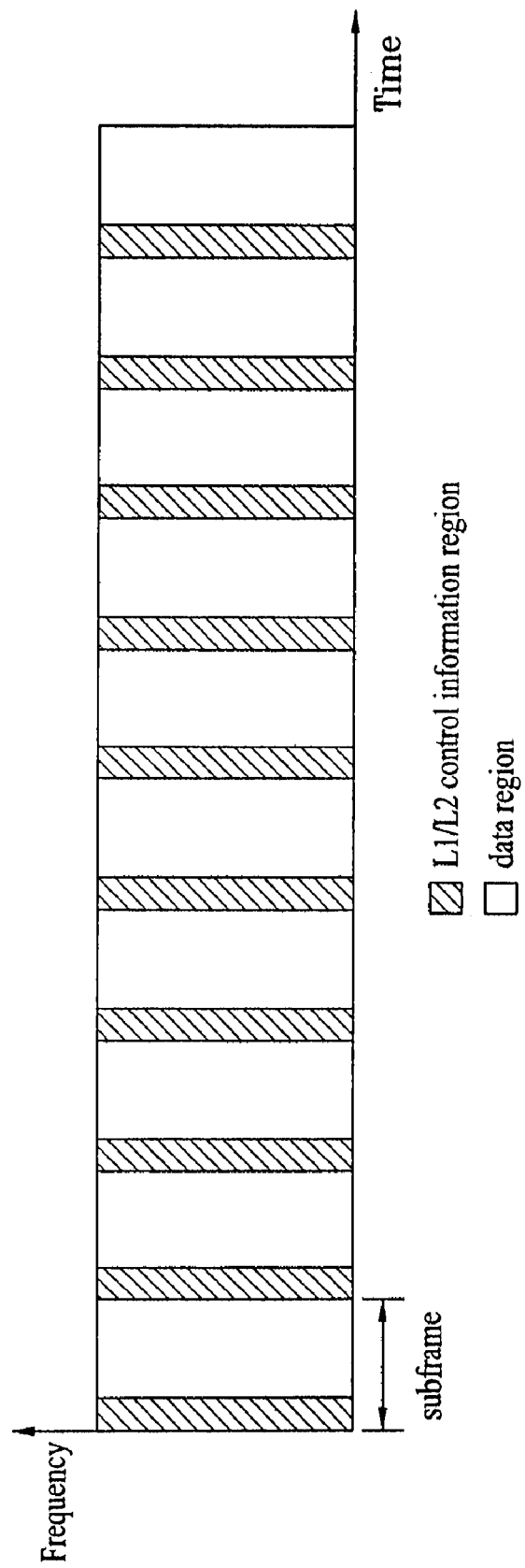
FIG. 1 is a diagram illustrating an example of a structure of a physical channel used in an E-UMTS (Evolved-Universal Mobile Telecommunications System)
Figure 2:
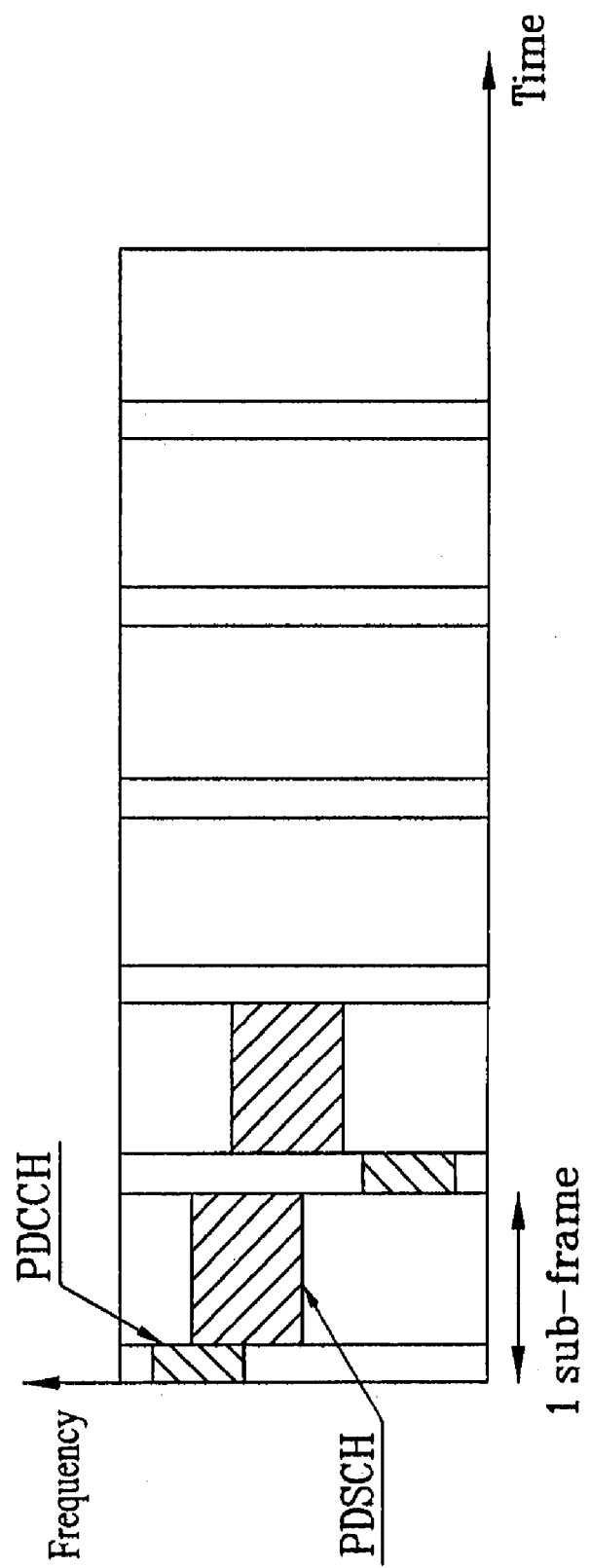
FIG. 2 is a diagram illustrating a general method of transmitting data in an E-UMTS.
Figure 3:
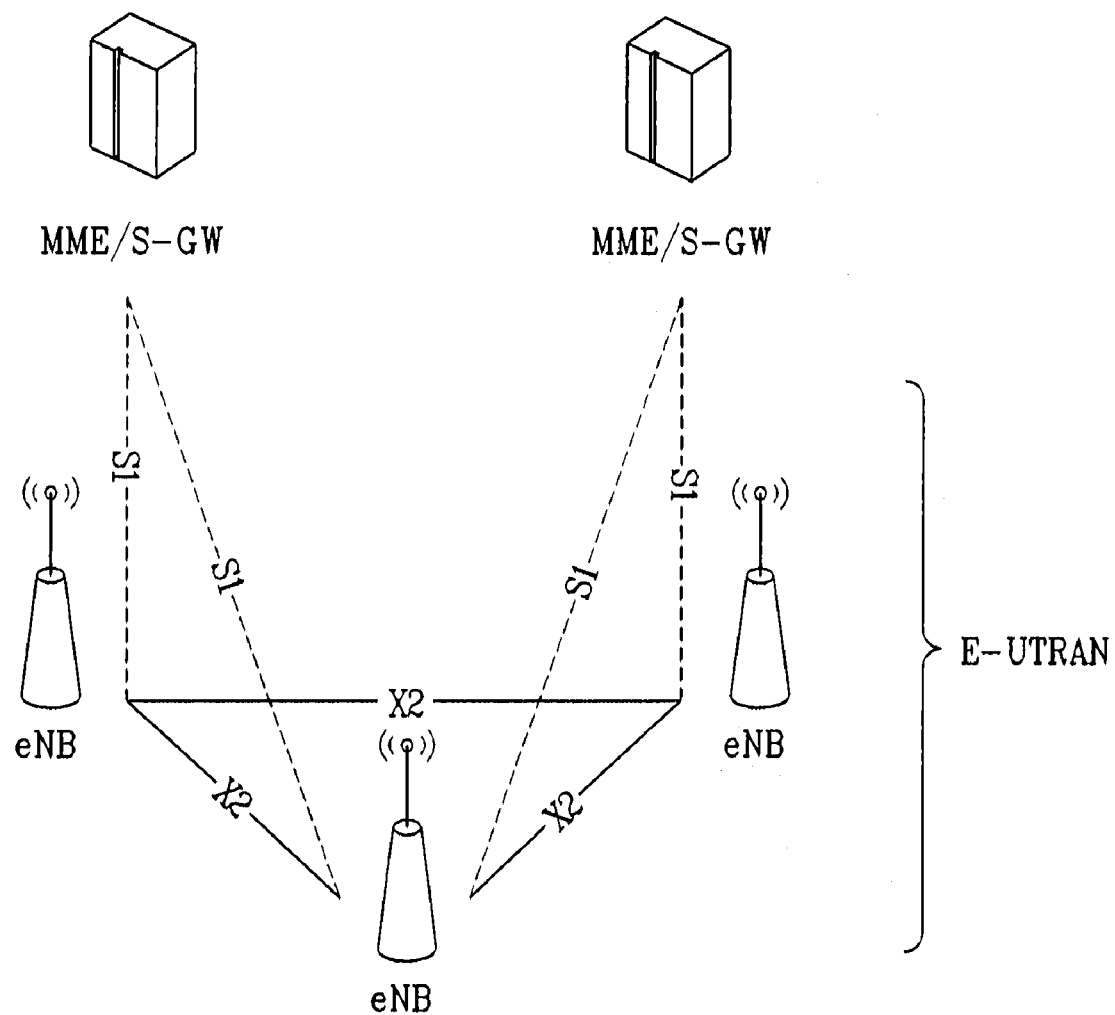
FIG. 3 is a diagram illustrating a network structure of an E-UMTS.

FIG. 3 illustrates a network structure of an E-UMTS. An E-UMTS is a system evolving from the conventional WCDMA UMTS and its basic standardization is currently handled by the 3GPP (3$^{rd}$ Generation Partnership Project). The E-UMTS can also be called an LTE (Long Term Evolution) system.

Referring to FIG. 3, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 4:
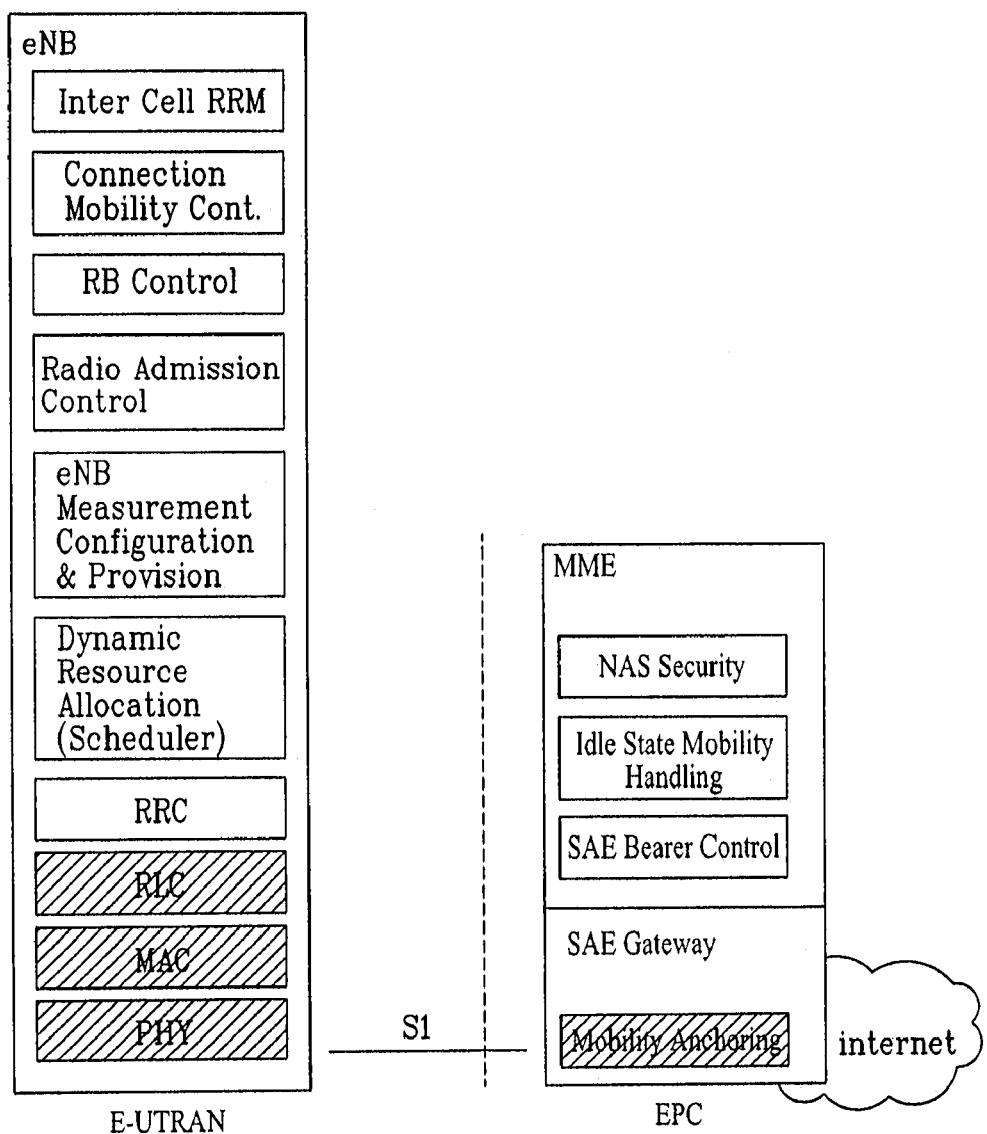
FIG. 4 is a schematic view illustrating an E-UTRAN (Evolved Universal Terrestrial Radio Access Network)

FIG. 4 is a schematic view illustrating an E-UTRAN (UMTS terrestrial radio access network). In FIG. 4, a hatching part represents functional entities of a user plane, and a non-hatching part represents functional entities of a control plane.

Figure 5A:
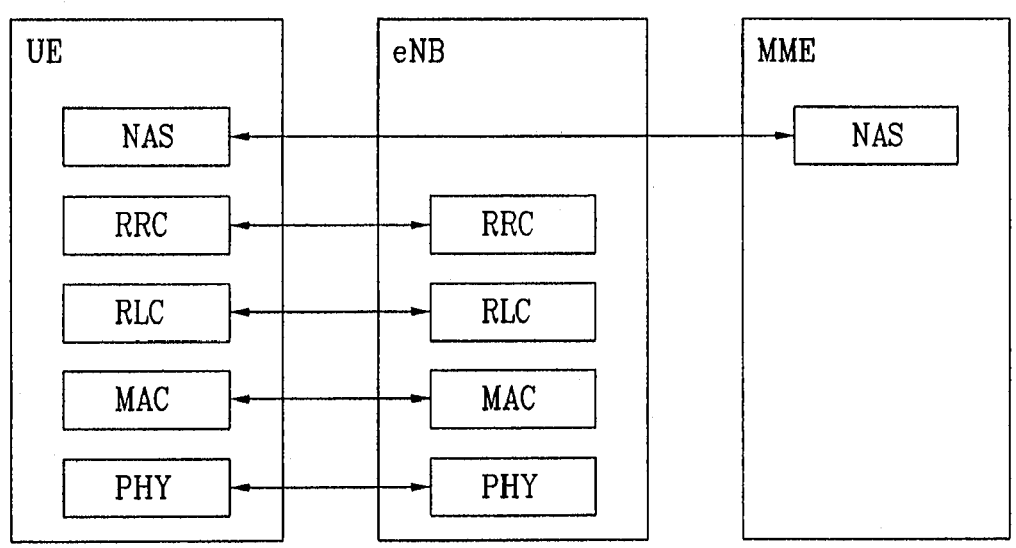
Figure 5B:
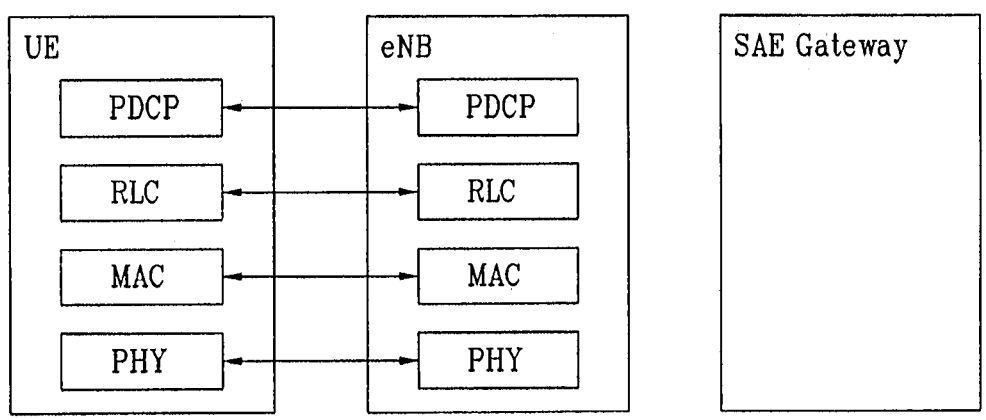

FIG. 5A and FIG. 5B illustrate a structure of a radio interface protocol between the user equipment (UE) and the E-UTRAN, in which FIG. 5A is a schematic view of a control plane protocol and FIG. 5B is a schematic view of a user plane protocol. Referring to FIG. 5A and FIG. 5B, a radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

Figure 6:
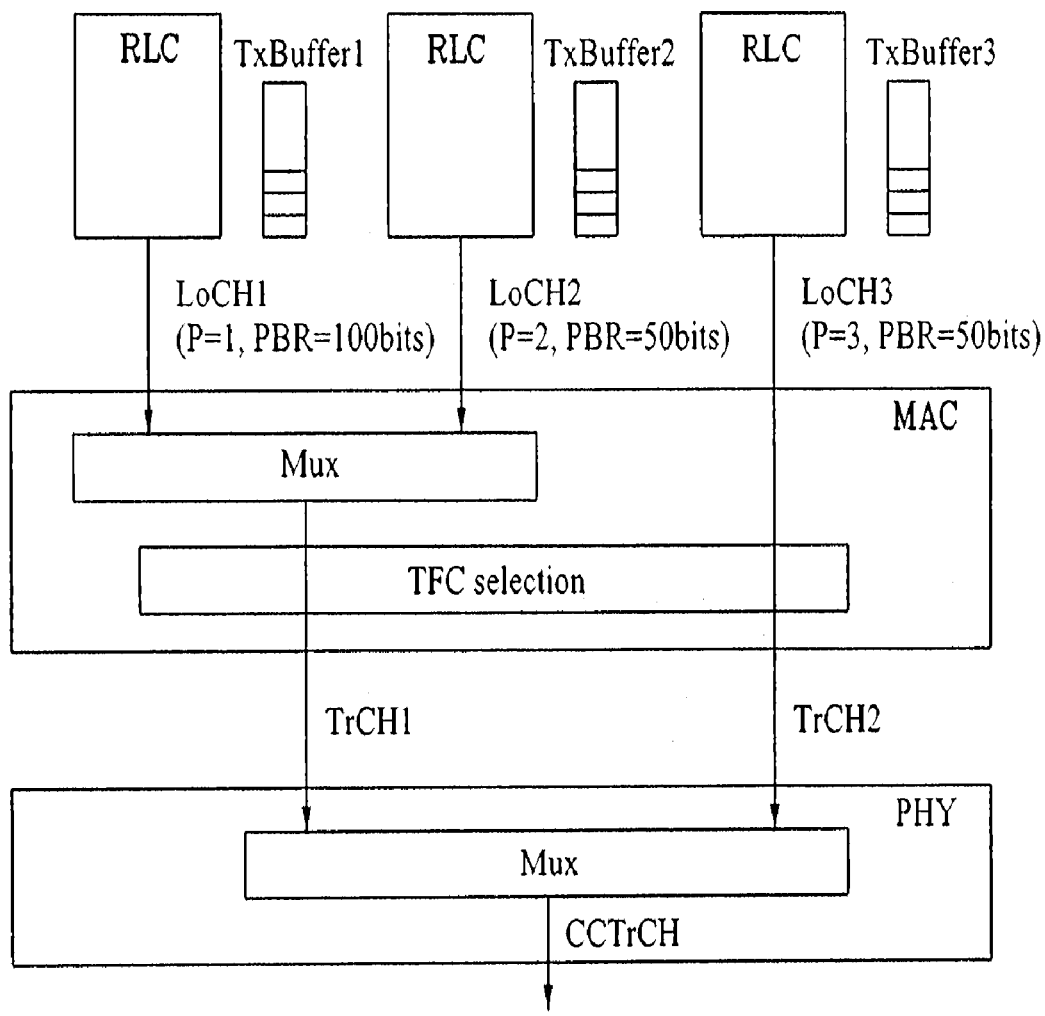
FIG. 6 is a diagram illustrating a data transfer structure in RLC, MAC and PHY layers of a transmitting side in a wireless communication system according to one embodiment of the present invention.

FIG. 6 is a diagram illustrating a data transfer structure in RLC, MAC and PHY layers of a transmitting side in a wireless communication system according to one embodiment of the present invention.

Referring to FIG. 6, data are transferred from the RLC layer to the MAC layer through three logical channels (LoCH1, LoCH2, and LoCH3). Priority and a prioritized bit rate (PBR) are set in each logical channel. According to the example of FIG. 6, priority of LoCH1 is the highest (P=1), and its PBR is 100 bits. Also, priority of LoCH2 is the second (P=2), and its PBR is 50 bits. Moreover, priority of LoCH3 is the lowest (P=3), and its PBR is 50 bits. The PBR means an amount of minimum data guaranteed to be transmitted through each logical channel regardless of the priority. A maximum bit rate (MER) may be set as the case may be, wherein the MBR means an amount of maximum data to be transmitted per each logical channel.

Priority, PBR or MBR for each logical channel is set considering quality of a service provided through a corresponding logical channel. For example, the highest priority is allocated to a logical channel through which a service having the highest importance is provided, and the lowest priority is allocated to a logical channel through which a service having the lowest importance is provided. The PBR and/or the MBR is set to provide service quality of a certain level regardless of the priority. In FIG. 6, although the priority of LoCH3 is the lowest, data transmission is assured per transport time interval (TTI) as much as the PBR (50 bits) of LoCH3.

The LoCH1 and the LoCH2 undergo multiplexing by the MAC layer and then are mapped with the physical layer through a first transport channel (TrCH1). Data stored in transmission buffers (TxBuffer1 to TxBuffer3) corresponding to each logical channel respectively are transferred to the MAC layer through a corresponding logical channel in a type of MAC SDU (MAC Service Data Unit). The MAC layer generates MAC PDU (MAC Protocol Data Unit) and then transfers the generated MAC PDU to the physical layer, wherein the MAC PDU includes at least part of the MAC SDU received through each logical channel. In FIG. 6, since LoCH1 and LoCH2 undergo multiplexing in the MAC layer, MAC SDUs transferred through LoCH1 and LoCH2 are included in one MAC PDU.

The embodiments according to the present invention relate to a method of reporting how much service quality required for each logical channel has been satisfied in the MAC layer of the transmitting side to the receiving side. In addition to the aforementioned functions, the MAC layer can perform functions such as data retransmission according to HARQ, dynamic scheduling between user equipments, and transport format selection etc.

Figure 7A:
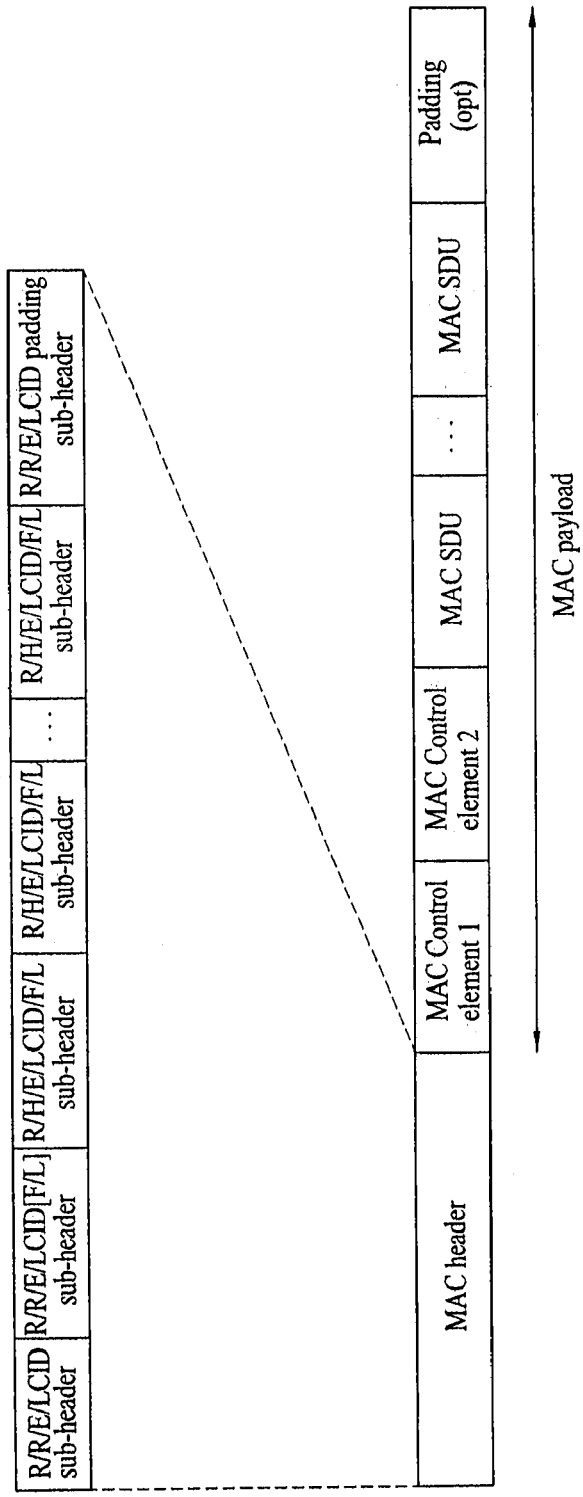

FIG. 7A to FIG. 7C are diagrams illustrating data formats of a MAC PDU (protocol data unit) according to one embodiment of the present invention.

Referring to FIG. 7A, the MAC PDU includes a MAC header part and a MAC payload part. The payload part can include at least one MAC SDU, MAC control element, and a padding part. The MAC header and the MAC SDU have a variable length. The MAC header includes one or more MAC subheaders, each of which corresponds to a MAC control element, MAC SDU, or padding part. The order of the MAC subheaders is coincident with that of corresponding MAC control elements, MAC SDUs and the padding part.

Except for the last MAC subheader included in the MAC PDU and the MAC subheader corresponding to a MAC control element having a fixed size, each subheader includes six fields of R/H/E/LCID/F/L, as illustrated in (a) and (b) of FIG. 7B. The last MAC subheader included in the MAC PDU and the MAC subheader corresponding to the MAC control element of the fixed size include four fields of R/R/E/LCID, as illustrated in FIG. 7C.

In FIG. 7A to FIG. 7C, the LCID field includes identification information of the logical channel through which the corresponding MAC service data unit (MAC SDU) is transferred, or information indicating what kind of information has been included in the corresponding MAC element. An LCID corresponding to a buffer status report (BSR) control element identifies whether the corresponding BSR is a short BSR or a long BSR. An extension (E) field includes information indicating whether another MAC subheader exists behind the corresponding MAC subheader. An F field includes information indicating a length of an L field following the F field. The L field includes information indicating a length of the corresponding MAC SDU or MAC information element in a byte unit. The L field can include 7 bits ((a) of FIG. 7B) or 15 bits ((b) of FIG. 7B. A reserved (R) field is a field of which use is reserved.

Figure 8A:
FIG. 8A and FIG. 8B are diagrams illustrating data formats of a short BSR and a long BSR.
Figure 8B:

The BSR is performed so that the user equipment reports its buffer status to the base station. FIG. 8A and FIG. 8B respectively illustrate data formats of a short BSR and a long BSR. In FIG. 8A, LCG ID means a logical channel group identifier. The user equipment can group maximum four logical channels in one logical channel group and report the buffer status of the logical channel group to the network. In this way, if the buffer status report is performed for each logical channel group through grouping, overhead that may occur can be reduced. The base station can notify the user equipment of the grouping method for the logical channels. The long BSR of FIG. 8B includes four buffer size fields respectively corresponding to LCG ID #1 to LCG ID #4. Each buffer size field includes a size of all data, which are standby for transmission in the RLC layer and the PDCP layer included in the corresponding logical channel group.

The BSR of FIG. 8A or FIG. 8B is included in the MAC PDU (MAC protocol data unit). Namely, the BSR is included in a BSR control element, which is one of control elements of MAC PDU generated in the MAC layer of the user equipment.

In FIG. 7A to FIG. 7C, a happy bit (H) field includes indication information indicating whether the PBR previously set for a logical channel through which a corresponding MAC SDU has been transferred. Namely, the indication information indicates whether the PBR for the logical channel indicated by the LCID field of the subheader corresponding to a specific MAC SDU included in the MAC PDU has been satisfied for a certain time period. For example, if the PBR set for the corresponding logical channel is satisfied for a corresponding transport time interval, the H field can be set to "1". If not so, the H field can be set to "0".

Hereinafter, the H field will be described in more detail with reference to the example of FIG. 6. In FIG. 6, it is assumed that data of 200 bits are stored in a transmission buffer TxBuffer1 of the LoCH1 and data of 100 bits are stored in a transmission buffer TxBuffer2 of the LoCH2 in a specific TTI. If radio resources for transmitting data of 240 bits through TrCH1 are allocated in the corresponding TTI, data transmission as much as PBR of each logical channel is first ensured so that data of 100 bits and data of 50 bits are transferred to the MAC layer through the LoCH1 and the LoCH2. Then, data of other 90 bits are transferred to the MAC layer through the LoCH1 having relatively high priority. The MAC layer generates a MAC PDU including a MAC SDU transferred through the LoCH1 and the LoCH2. In this case, since the PBR is satisfied for the LoCH1 and the LoCH2 in the corresponding TTI, the H field corresponding to each of the LoCH1 and the LoCH2 is set to "1".

If it is assumed that data are not newly stored in the transmission buffers TxBuffer1 and TxBuffer2, data of 10 bits are transferred to the MAC layer through the LoCH1 in accordance with the PBR previously set for each logical layer. Also, data of 50 bits are transferred to the MAC layer through the LoCH2. In this case, since the PBR is satisfied for the LoCH1 and the LoCH2 in the corresponding TTI, the H field corresponding to each of the LoCH1 and the LoCH2 is set to "1".

If data of 100 bits are respectively stored in the transmission buffers TxBuffer1 and TxBuffer2 for next TTI and channel resources for transmitting data of 80 bits are allocated to the first transport channel TrCH1, although data of 50 bits are transferred to the MAC layer through the LoCH1 in accordance with the PBR, only data of 30 bits that do not reach the PBR can be transferred to the MAC layer through the LoCH2. Accordingly, since the PBR has been satisfied for the LoCH1 but the PBR has not been satisfied for the LoCH2, the H field corresponding to the LoCH1 is set to "1" in the MAC PDU generated by the MAC layer for the corresponding TTI and the H field corresponding to the LoCH2 is set to "0".

According to another embodiment, indication information included in the H field can include indication information indicating whether the PBR set for the corresponding logical channel has been satisfied for a previously set certain time or a predetermined number of transport time intervals which are previously set. For example, if the amount of data transferred to the MAC layer through the LoCH1 and the LoCH2 during five TTIs is larger than the PBR set for each logical channel, the H field corresponding to each logical channel included in the MAC PDU generated for the fifth TTI is set to "1".

According to still another embodiment, the MAC layer can indicate whether there is a logical channel that does not ensure the PBR among logical channels established using one of a plurality of H fields included in the generated MAC PDU. For example, in FIG. 6, if the PBR set for any one of the logical channels LoCH1 and LoCH2 is not satisfied during a specific transport time interval or a certain time, the MAC layer sets a specific field of the H fields included in the corresponding MAC PDU, for example, H field corresponding to the LoCH2, to "0". In this embodiment, only one H field can be included in one MAC PDU.

According to further still another embodiment, the MAC layer can include one H field per logical channel group in the generated MAC PDU. As described above, the user equipment can group maximum four logical channels in one logical channel group and report the buffer status of the logical channel group to the network. Accordingly, the H field can be set for each logical channel group. For example, if the PBR is not satisfied for at least one of the four logical channels included in one logical channel group, the H field corresponding to at least one of the four logical channels can be set to "0". Moreover, it is apparent to those skilled in the art that one H field can be set per radio bearer (RB) or radio bearer group.

In the aforementioned embodiments, if the PBR is set for a specific logical channel, it means that the PBR value of the corresponding logical channel is greater than 0. Also, whether the PBR set for the corresponding logical channel is satisfied when setting the H field of the MAC PDU can be determined only if data are stored in the transmission buffer of the corresponding logical channel.

Hereinafter, an embodiment where one or more H fields included in the MAC PDU are used for another purpose of use will be described.

Internet service provided through the wireless communication system can be classified into a guaranteed bit rate (GBR) service and a Non-GBR service. The GBR service means a service where data are generated and transmitted at a certain data rate, like audio service (VoIP) or video service. The Non-GBR service means a service where data are neither generated nor transmitted at a certain data rate. In case of the GBR service, since the network can predict how much data are generated at a specific time, the user equipment does not need to continue to transmit buffer status information to the network. However, if the quantity of data generated in respect of the GBR service exceeds a predictable range, the user equipment needs to report the buffer status to the network. In this case, the user equipment can use an H field included in the MAC PDU. Namely, if the amount of data generated at a specific time in respect of the service provided through a specific logical channel is more than a first reference value or less than a second reference value, the user equipment sets the H field corresponding to the logical channel to a previously set value and then transmits the set value.

In the embodiments of the present invention, the transmitting side can transmit whether the PBR is satisfied or buffer status information to the receiving side, by using a part other than the H field included in the MAC PDU. For example, with respect to the logical channel for which PBR is not satisfied for a certain time or a certain time interval, the MAC layer of the transmitting side can transmit MAC information element to the receiving side, wherein the MAC information element includes the presence of the logical channel for which PBR is not satisfied or identifier of the corresponding logical channel.

In the embodiments of the present invention, the following two methods can be considered as detailed methods of determining whether PBR has been satisfied for each logical channel. The following description can also be applied equally to a maximum bit rate (MBR).

First, whether the PBR is satisfied for each logical channel is determined using user data except for overhead. A MAC SDU is transferred from the RLC layer to the MAC layer. An RLC SDU is transferred from RRC layer or PDCP layer, which is an upper layer of the RLC layer, to the RLC layer. The MAC SDU includes an RRL header and RLC header, or includes a PDCP header and an RLC header. When determining whether the PBR is satisfied for each logical channel, the RLC header part can be excluded. Also, whether the PBR is satisfied for each logical channel can be determined except for the RRC header, PDCP header or MAC header part. Also, whether the PBR is satisfied for a MAC SDU transferred through each logical channel can be determined except for the RLC header and RRC header, or RLC header and PDCP header part. Meanwhile, if header compression is performed in the PDCP layer, a PDCP SDU where header compression is not performed can be considered to determine whether the PBR is fulfilled. Also, a data block having no relation with the PDCP SDU, such as feedback packet or status report generated in the PDCP layer, is not considered when the PBR is determined. A control PDU generated in the RLC layer is not considered either.

Second, overhead having no relation with user data is considered to determine whether the PBR is satisfied. Namely, when it is determined whether the PBR is satisfied for a specific logical channel, an RLC header, PDCP header, RRC header or MAC header part can be considered. Also, if header compression is performed in the PDCP layer, after header compression, a PDCP PDU is considered when it is determined whether the PBR is satisfied. Meanwhile, feedback packet or status report generated in the PDCP layer or the control PDU generated in the RLC layer can be considered when it is determined whether the PBR is satisfied.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of transmitting a data block in a user equipment of a wireless communication system, the method comprising:
receiving upper layer data through at least one upper layer channel established in the user equipment;
generating a data block including at least a part of the upper layer data, at least one channel indicator indicating each of the at least one upper layer channel, and information associated with a transmission buffer status of the at least one upper layer channel, wherein the information associated with the transmission buffer status indicates whether a prioritized bit rate (PBR) established in the user equipment is satisfied; and
transferring the generated data block to a lower layer,
wherein the PBR is defined by an amount of minimum data guaranteed to be transmitted through each of the at least one upper layer channel, and
wherein the user equipment determines the information associated with the transmission buffer status by using user data of the upper layer data excluding at least one upper layer header included in the upper layer data.

2. The method of claim 1, wherein the PBR is previously set per the at least one upper layer channel established in the user equipment.

3. The method of claim 1, wherein the information associated with the transmission buffer status is included per each logical channel of the generated data block.

4. The method of claim 1, wherein the information associated with the transmission buffer status is included per each logical channel group of the generated data block.

5. The method of claim 1, wherein the information associated with the transmission buffer status is included per each radio bearer or radio bearer group in the generated data block.

* * * * *